(12) United States Patent
Luther et al.

(10) Patent No.: US 7,568,844 B2
(45) Date of Patent: Aug. 4, 2009

(54) RUGGEDIZED FIBER OPTIC CONNECTOR ASSEMBLY

(75) Inventors: James P. Luther, Hickory, NC (US); Thomas Theuerkorn, Hickory, NC (US); Xin Liu, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/504,349

(22) Filed: Aug. 15, 2006

(65) Prior Publication Data

US 2008/0044137 A1    Feb. 21, 2008

(51) Int. Cl.
G02B 6/38 (2006.01)
G02B 6/42 (2006.01)

(52) U.S. Cl. ............... 385/60; 385/65; 385/52

(58) Field of Classification Search ............ 385/60, 385/65, 52
See application file for complete search history.

(56) References Cited

U.S. PATENT DOCUMENTS

| | | | | |
|---|---|---|---|---|
| 4,354,731 A | | 10/1982 | Mouissie | 350/96.2 |
| 4,934,785 A | * | 6/1990 | Mathis et al. | 385/68 |
| 5,028,114 A | | 7/1991 | Krausse et al. | 385/78 |
| 5,129,023 A | | 7/1992 | Anderson et al. | 385/70 |
| 5,548,677 A | * | 8/1996 | Kakii et al. | 385/92 |
| 5,604,832 A | * | 2/1997 | Hall et al. | 385/89 |
| 5,606,635 A | * | 2/1997 | Haake | 385/53 |
| 5,751,874 A | | 5/1998 | Chudoba et al. | 385/72 |
| 5,764,833 A | * | 6/1998 | Kakii et al. | 385/54 |
| 5,778,122 A | | 7/1998 | Giebel | 385/55 |
| 5,887,095 A | * | 3/1999 | Nagase et al. | 385/58 |
| 5,923,804 A | | 7/1999 | Rosson | 385/51 |
| 5,993,071 A | | 11/1999 | Hultermans | 385/70 |
| 6,149,313 A | | 11/2000 | Giebel et al. | 385/60 |
| 6,151,432 A | | 11/2000 | Nakajima et al. | 385/78 |
| 6,224,270 B1 | | 5/2001 | Nakajima et al. | 385/78 |
| 6,234,683 B1 | | 5/2001 | Waldron et al. | 385/78 |
| 6,234,685 B1 | | 5/2001 | Carlisle et al. | 385/83 |
| 6,355,976 B1 | * | 3/2002 | Faris | 257/686 |
| 6,497,516 B1 | * | 12/2002 | Toyooka et al. | 385/78 |
| 6,579,014 B2 | | 6/2003 | Melton et al. | 385/76 |

(Continued)

FOREIGN PATENT DOCUMENTS

EP    0468671    7/1990

(Continued)

OTHER PUBLICATIONS

Patent Cooperation Treaty, International Search Report for International Application No. PCT/US07/017968, Mar. 26, 2008, 3 pages.

*Primary Examiner*—K. Cyrus Kianni

(57) ABSTRACT

A ruggedized fiber optic connector assembly includes a substantially hollow plug housing; and a glue body disposed within the substantially hollow plug housing; wherein the glue body includes a first portion that is configured to engage and retain an optical cable comprising an optical fiber and one or more strength members; wherein the glue body includes a second portion that is configured to engage and retain a connector sub-assembly comprising an optical ferrule; wherein the second portion of the glue body includes a pair of opposed snap hooks that are configured to engage a corresponding pair of opposed recesses of the connector sub-assembly; and wherein the optical fiber and the optical ferrule are optically coupled.

15 Claims, 8 Drawing Sheets

U.S. PATENT DOCUMENTS

| | | | |
|---|---|---|---|
| 6,648,520 B2 | 11/2003 | McDonald et al. | 385/78 |
| 6,910,812 B2 * | 6/2005 | Pommer et al. | 385/92 |
| 7,048,450 B2 * | 5/2006 | Beer et al. | 385/88 |
| 7,090,406 B2 | 8/2006 | Melton et al. | 385/62 |
| 7,090,407 B2 | 8/2006 | Melton et al. | 385/62 |
| 7,104,703 B2 * | 9/2006 | Nagasaka et al. | 385/88 |
| 7,111,990 B2 | 9/2006 | Melton et al. | 385/53 |
| 7,113,679 B2 | 9/2006 | Melton et al. | 385/113 |
| 2004/0223701 A1 * | 11/2004 | Tanaka et al. | 385/55 |
| 2005/0069264 A1 | 3/2005 | Luther et al. | 385/59 |
| 2006/0193562 A1 * | 8/2006 | Theuerkorn | 385/53 |
| 2006/0204178 A1 * | 9/2006 | Theuerkorn et al. | 385/59 |
| 2007/0025665 A1 * | 2/2007 | Dean et al. | 385/78 |

FOREIGN PATENT DOCUMENTS

| | | |
|---|---|---|
| EP | 0547778 | 12/1991 |
| EP | 0940700 | 2/1993 |
| EP | 0949522 A2 | 4/1998 |
| EP | 0949522 A3 | 4/1998 |
| EP | 1065542 | 6/1999 |
| EP | 949522 A2 * | 10/1999 |
| WO | WO01/27660 | 4/2001 |

* cited by examiner

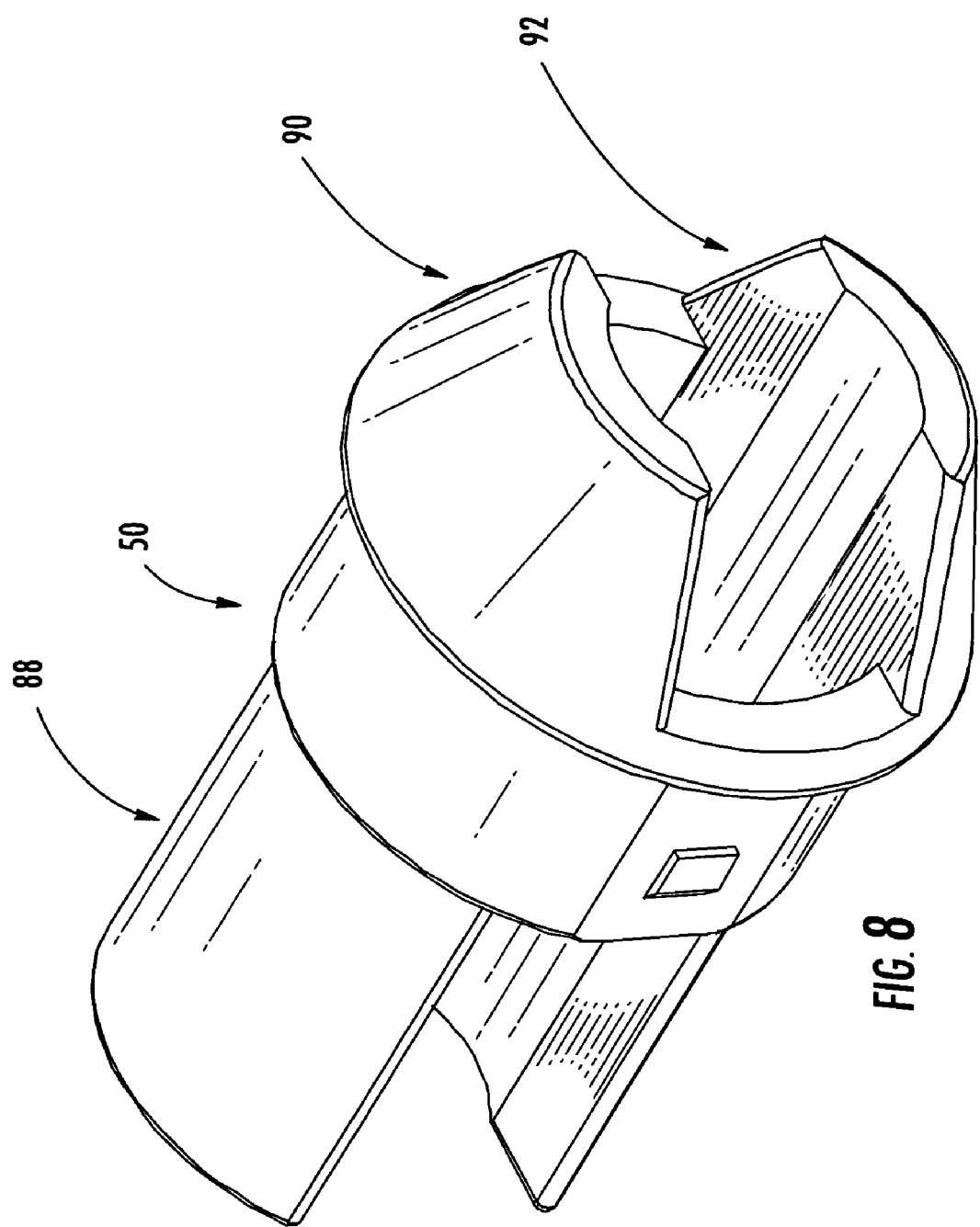

RUGGEDIZED FIBER OPTIC CONNECTOR ASSEMBLY

BACKGROUND OF THE INVENTION

1. Field of the Invention

The present invention relates generally to a ruggedized fiber optic connector assembly, also referred to as a fiber optic "plug." More specifically, the present invention relates to a ruggedized fiber optic connector assembly that incorporates a retention body, or glue body, that is configured to both retain a fiber optic cable, preferably having one or more strength members, and engage a fiber optic receptacle or, alternatively, another fiber optic connector assembly.

2. Technical Background of the Invention

Optical fiber is increasingly being used for a variety of broadband applications, including voice, video, and data transmission. As a result, fiber optic communications networks include a number of interconnection points at which multiple optical fibers are interconnected. Fiber optic communications networks also include a number of connection terminals, examples of which include, but are not limited to, network access point (NAP) enclosures, aerial closures, below grade closures, pedestals, optical network terminals (ONTs), network interface devices (NIDs), and multi-port devices. In certain instances, the connection terminals include connector ports, typically opening through an external wall of the connection terminals, that are used to establish optical connections between optical fibers that are terminated from a distribution cable and respective optical fibers of one or more pre-connectorized drop cables, extended distribution cables, tether cables, or branch cables, collectively referred to as "drop cables." The connection terminals are used to readily extend fiber optic communications services to a subscriber. In this regard, fiber optic communications networks are being developed that deliver "fiber-to-the-curb" (FTTC), "fiber-to-the-business" (FTTB), "fiber-to-the-home" (FTTH), and "fiber-to-the-premises" (FTTP), generically referred to as "FTTx."

A conventional connector port opening through an external wall of a connection terminal typically includes a receptacle that is configured to receive a connectorized optical fiber on the inside of the terminal, and a connectorized drop cable on the outside of the terminal. One of the mating ferrules is mounted on the end of an optical fiber that is optically interconnected to at least one optical fiber of the distribution cable within the connection terminal. The other mating ferrule is mounted on the end of an optical fiber of a drop cable that is inserted into the receptacle from the outside of the connection terminal. An alignment sleeve of the receptacle typically assists in the alignment of the ferrules, and ferrule guide pins or other alignment means may further assist in the precise alignment of multifiber ferrules.

In particular, a plug mounted on the end of the drop cable engages one side of a corresponding receptacle. Typically, the plug includes a substantially cylindrical plug body, and a fiber optic connector including a plug ferrule disposed within the plug body. The end of the plug body is open, or is provided with one or more openings, such that the ferrule is accessible within the plug body, for example to be cleaned. The ferrule is mounted on the end of one or more optical fibers of the drop cable such that mating the plug with the receptacle aligns the optical fibers of the drop cable with the respective optical fibers terminated from the distribution cable within the connection terminal. In the process of mating the plug with the receptacle, the ferrule is inserted into one end of the alignment sleeve housed within the receptacle. As a result of the construction of a conventional plug, the alignment sleeve is minimally received within the open end of the plug body as the ferrule is inserted into the alignment sleeve. As an alternative to the above, the plug mounted on the end of the drop cable engages a plug mounted on the end of another drop cable or another receptacle not associated with a connection terminal, such as that associated with a business, home, premises, etc.

Several different types of conventional connectors have been developed, examples of which include, but are not limited to, SC, ST, LC, MTP, MT-RJ, and SC-DC. The size and shape of the ferrule of each of these connectors is somewhat different. Correspondingly, the size and shape of the plug body and alignment sleeve are somewhat different. As a result, in conventional practice, different plugs and receptacles are used in conjunction with different ferrules. In this regard, the receptacles generally define different sized internal cavities and features corresponding to different sized alignment sleeves and plug bodies, and, in turn, different ferrules disposed within the plug bodies and alignment sleeves.

Referring to prior art FIG. 1, a conventional connector 10 includes a plug housing 12 in which a crimp body 14 including two halves 14a,14b and a crimp band 16 are axially disposed during assembly. A heat shrink 18 is also utilized, as described in greater detail below. Collectively, the crimp body 14 and crimp band 16 retain both a drop cable 20 and a connector sub-assembly 22 (i.e., a pre-assembled ferrule holder module), the connector sub-assembly 22 holding a ferrule 24. Specifically, a shaft 25 of the connector sub-assembly 22 is secured between the two halves 14a,14b of the crimp body 14. As a result, an optical fiber of the drop cable 20 and the ferrule 24 are optically connected. The heat shrink 18 is disposed about an end portion of the plug housing 12 and an end portion of the drop cable 20, thereby providing some retention force and stress relief, and a flexible environmental seal. As illustrated, the drop cable 20 is a single-fiber drop cable and the ferrule 24 is a single-termination ferrule, although other types of drop cables, optical fibers, and ferrules could be used with other types of connectors. This inner assembly is partially housed within a coupling nut 26 that is externally threaded such that the connector 10 is configured to engage the internal threading of an alignment sleeve of a receptacle (not shown), thereby aligning and optically mating the ferrule 24 of the connector 10 and a ferrule of the receptacle. As described above, guide pins or other alignment means may assist in more precise alignment of multi-fiber ferrules. For example, the end of the plug housing 12 and the alignment sleeve and/or receptacle may be keyed. The connector 10 also includes one or more silicone O-rings 28 that environmentally seal the connector 10 and receptacle, when joined, and a boot 30 that further relieves stress in the drop cable 20. Finally, the connector 10 incorporates one or more dust caps 32,34 that are used to selectively protect the ferrule 24 and the exposed end of the plug housing 12. Preferably, the larger of the dust caps 34, also referred to as the "pulling cap," is internally threaded such that it is configured to engage the external threading of the coupling nut 26. Finally, the pulling cap 34 is secured to the boot 20 via a plastic lanyard 36 or other retention means, such that the pulling cap 34 is not easily lost. The connector 10 provides a hardened connector for outside plant deployment and incorporates an integral pulling eye 38 designed for pulling tension.

As of yet, however, there is an unresolved need for an alternative (or additional) retention method for dealing with otherwise incompatible drop cable strength members, such as glass-reinforced plastic (GRP) strength members and the like.

The handling and mating of the two halves 14a,14b of the crimp body 14 described above often applies excessive stress and jeopardizes the optical fiber (which typically has a diameter of about 250 µm) during termination. Further, this crimp design alone is typically not strong enough to meet pulling tension requirements, necessitating the use of an adhesive. This adhesive rigidly fixes the connector sub-assembly, eliminating the ability to compensate for radial offset due to manufacturing tolerances. This radial offset can be compensated for by "floating" the adapter, however, in a plug-to-plug arrangement, there is no such floating element. Thus, manufacturing tolerances become much more stringent. Still further, this crimp design, incorporating the heat shrink 18, relies on a hard stop of the plug housing 12 against the coupling nut 26 and, ultimately, the heat shrink 18 itself to keep the drop cable 20 and the connector sub-assembly 22 in the same position during process and use. In a high temperature environment, and due to improper fixturing during the application of the heat shrink 18, the plug housing 12 is allowed to move axially and piston in and out of position. As of yet, there is also an unresolved need for an alternative retention method that does not allow multiple ways (i.e., two 180-degree opposing ways) to assemble the connector components, thereby requiring fixturing and verification by an operator in order to make sure that the connector sub-assembly 22 is oriented properly. On occasion, this requires the cutting off of a good connector as the orientation of the endface angle is incompatible, resulting in wasteful scrap.

SUMMARY OF THE INVENTION

In one embodiment of the present invention, a ruggedized fiber optic connector assembly includes a substantially hollow plug housing; and a retention body disposed within the substantially hollow plug housing; wherein the retention body includes a first portion that is configured to engage and retain an optical cable comprising an optical fiber and one or more strength members; wherein the retention body includes a second portion that is configured to engage and retain a connector sub-assembly comprising an optical ferrule; and wherein the optical fiber and the optical ferrule are optically coupled.

In another embodiment of the present invention, a ruggedized fiber optic connector assembly includes a substantially hollow plug housing; and a retention body disposed within the substantially hollow plug housing; wherein the retention body includes a first portion that is configured to engage and retain an optical cable comprising an optical fiber and one or more strength members; wherein the retention body includes a second portion that is configured to engage and retain a connector sub-assembly comprising an optical ferrule; wherein the second portion of the retention body includes a pair of opposed snap hooks that are configured to engage a corresponding pair of opposed recesses of the connector sub-assembly; and wherein the optical fiber and the optical ferrule are optically coupled.

In a further embodiment of the present invention, a ruggedized fiber optic connector assembly includes a substantially hollow plug housing; and a glue body disposed within the substantially hollow plug housing; wherein the glue body includes a first portion that is configured to engage and retain an optical cable comprising an optical fiber and one or more strength members; wherein the glue body includes a second portion that is configured to engage and retain a connector sub-assembly comprising an optical ferrule; wherein the second portion of the glue body includes a pair of opposed snap hooks that are configured to engage a corresponding pair of opposed recesses of the connector sub-assembly; and wherein the optical fiber and the optical ferrule are optically coupled.

Additional features and advantages of the present invention will be set forth in the detailed description which follows, explaining the principles and operations thereof, and will also be readily apparent to those of ordinary skill in the art from the description and/or recognized by practicing the invention as described. It is to be understood that the general description above and the detailed description which follows present exemplary embodiments of the invention, which are intended to provide an overview and framework for understanding the nature and character of the invention as it is claimed. The accompanying drawings are incorporated into and constitute a part of this specification, illustrating and further highlighting the exemplary embodiments of the present invention.

BRIEF DESCRIPTION OF THE DRAWINGS

FIG. 8 is an isolated perspective view of an end cap used in conjunction with the connector assembly of FIG. 2.

DETAILED DESCRIPTION OF THE PREFERRED EMBODIMENTS

Reference will now be made in detail to the preferred embodiments of the present invention, examples of which are illustrated in the accompanying drawings. Whenever possible, like reference numbers will be used to refer to like components or parts.

Figure 1:
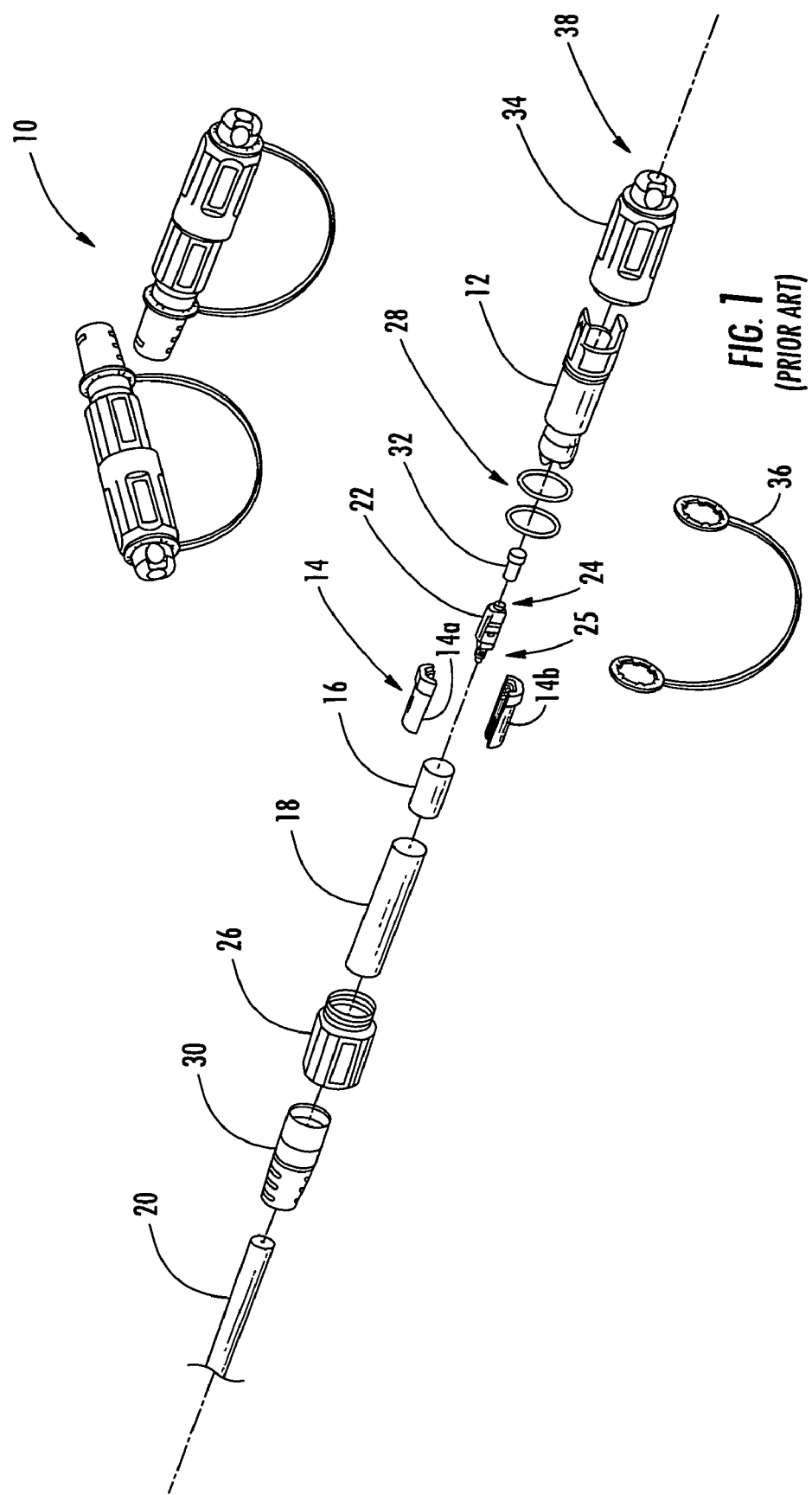
FIG. 1 is a perspective and exploded perspective view of a conventional connector.
Figure 2:
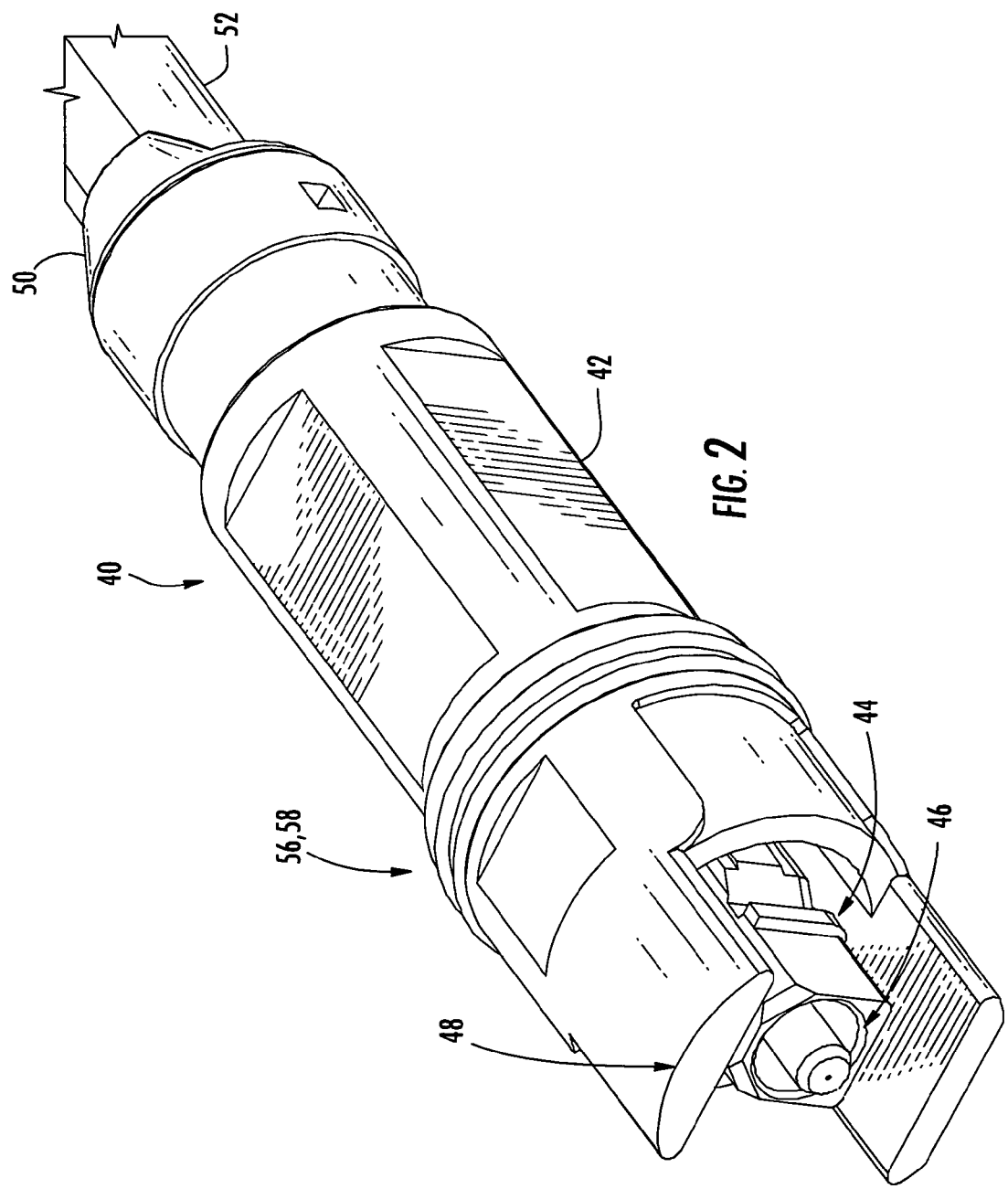
FIG. 2 is a perspective view of one embodiment of the connector assembly of the present invention.

Referring to FIG. 2, the connector assembly 40, also referred to herein as a "plug", of the present invention includes a plug housing 42 that contains a connector sub-assembly 44 (i.e., a pre-assembled ferrule holder module), the connector sub-assembly 44 holding a ferrule 46. The connector sub-assembly 44 and ferrule 46 are accessible through one open end of the plug housing 42, such that the ferrule can be optically connected to the ferrule of a receptacle or another connector assembly, or plug. The shrouding fingers 48 of the connector assembly 40 are reduced in length as compared to the conventional connector 10 (FIG. 1) in order to allow two connector assemblies to better mate with one another, among other things. Any reduced protection that results is compensated for by increased flexibility in situations requiring a more protruding ferrule 46. The more protruding ferrule 46 also allows for more efficient pre-assembly and termination, including polishing, etc. The keyed configurations of the inner assembly and plug housing 42 of the connector assembly 40 require that the connector assembly 40 be assembled in one specific orientation, as described in greater detail below. This addresses the unresolved need for an alternative retention method that does not allow multiple ways (i.e., two 180-degree opposing ways) to assemble the connector components, thereby eliminating the requirement for fixturing and verification by an operator in order to make sure that the connector sub-assembly 44 is oriented properly. The other end of the plug housing 42 is more open as compared to the conventional connector 10. This fact, and the configuration of the end cap 50 used, described in greater detail below, allow for relatively free flexural movement of the plug housing 42 relative to a substantially flat drop cable 52 that incorporates one or more GRP strength members 54 (FIGS. 3, 4, and 7) or the like, for example. The one or more silicone O-rings 28 (FIG. 1) of the conventional Optitap connector 10 may be replaced with a single integrally formed and overmolded O-ring 56 that is disposed within a recessed channel 58 that is manufactured into the exterior surface of the plug housing 42. Optionally, the exterior surface of the plug housing 42 includes a number of convenient gripping surfaces.

Figure 3:
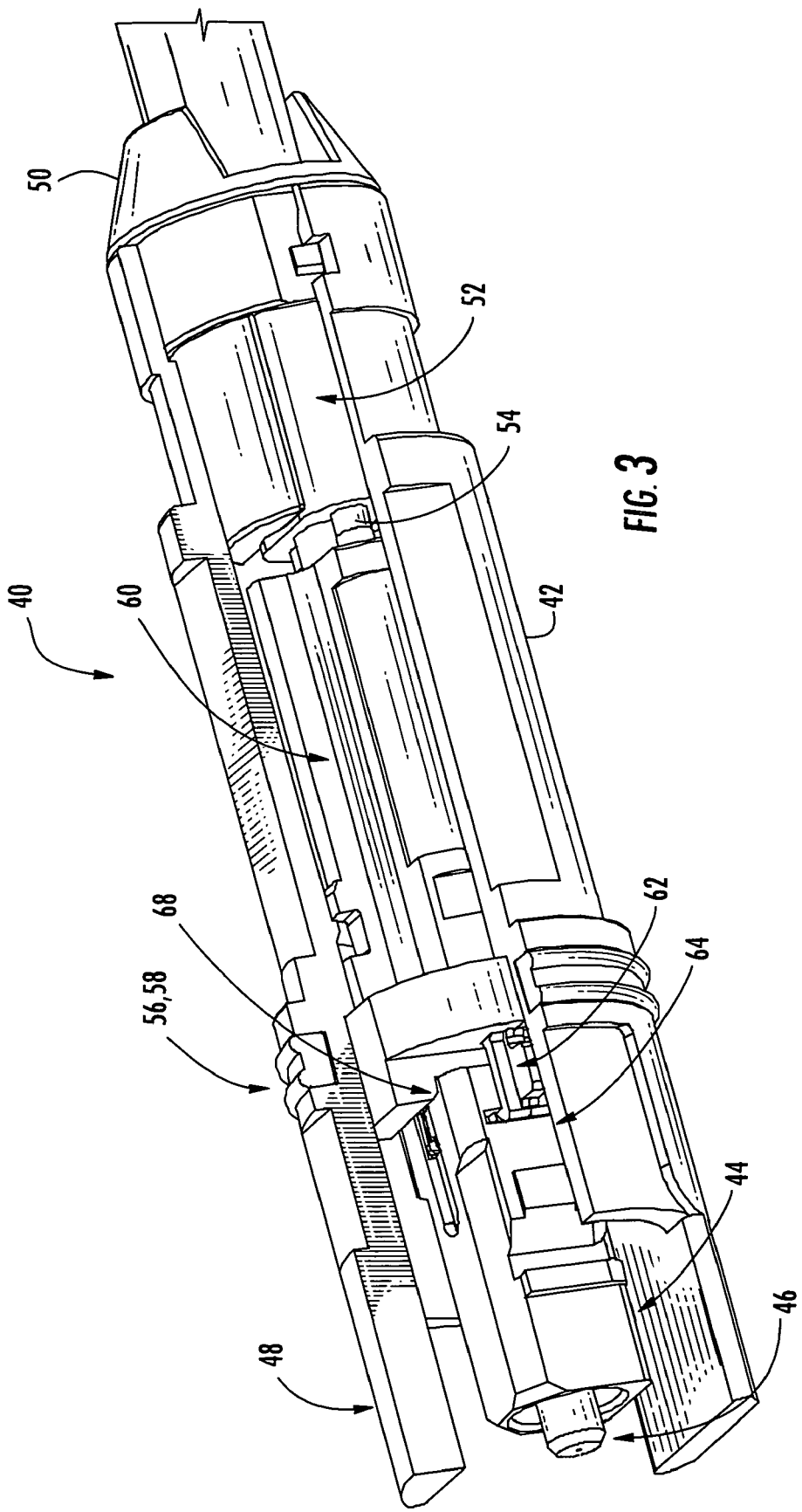
FIG. 3 is a cut-away perspective view of the connector assembly of FIG. 2, highlighting the use of a glue body that is configured to retain both a drop cable having one or more strength members and a connector sub-assembly.

Referring to FIG. 3, internally, the connector assembly 40 includes a retention body 60, or glue body, having a pair of snap hooks 62 configured to engage a pair of snap hook recesses 64 manufactured into opposing sides of the connector sub-assembly 44, the snap hooks 62 retaining the connector sub-assembly 44 against the glue body 60 once it is "snapped" into place. These snap hooks 62 each comprise a protruding "finger" member having a "hooked" end. Because the finger members have a degree of flexibility, they are deflected out of place or bent as the connector sub assembly 44 is pressed between them and "snap" back into place when the hooked ends of the finger members engage the snap hook recesses 64. Once the plug housing 42 is secured over the retention body and snap hooks, an interior surface of the plug housing 42 may contact the exterior surface of the snap hooks 62, maintaining the snap hooks 62 within the snap hook recesses 64. Advantageously, the snap hooks 62 or another sub-assembly retention feature allow the connector sub-assembly 44 to rotate slightly (± about 5 degrees maximum) about the axis of the glue body 60 and connector assembly 40, as the snap hook recesses 64 are somewhat oversized with respect to the snap hooks 62. The connector parts will self-align below about 45 degrees if the proper chamfer and lead-in detail exists, thus the sub-assembly retention feature allows the connector sub-assembly 44 to rotate less than about 45 degrees. This inherent radial float reduces the stringency of the manufacturing tolerances involved. This is especially important in an in-line application, where two connector assemblies are relatively rigidly aligned with respect to one another in order to meet mechanical performance requirements. In such applications, an alignment sleeve disposed between the connector assemblies is often not capable of adequately adjusting to both connector assemblies, which can have contrary orientations. The shaft 25 (FIG. 1) of the connector sub-assembly 44 is preferably disposed and held within a bore 66 (FIG. 6) manufactured into the end of the glue body 60 having the snap hooks 62. This end also includes a pair of alignment blocks 68 that are designed to ensure the proper positioning of the connector sub-assembly 44 on the face of the glue body 60.

Figure 4:
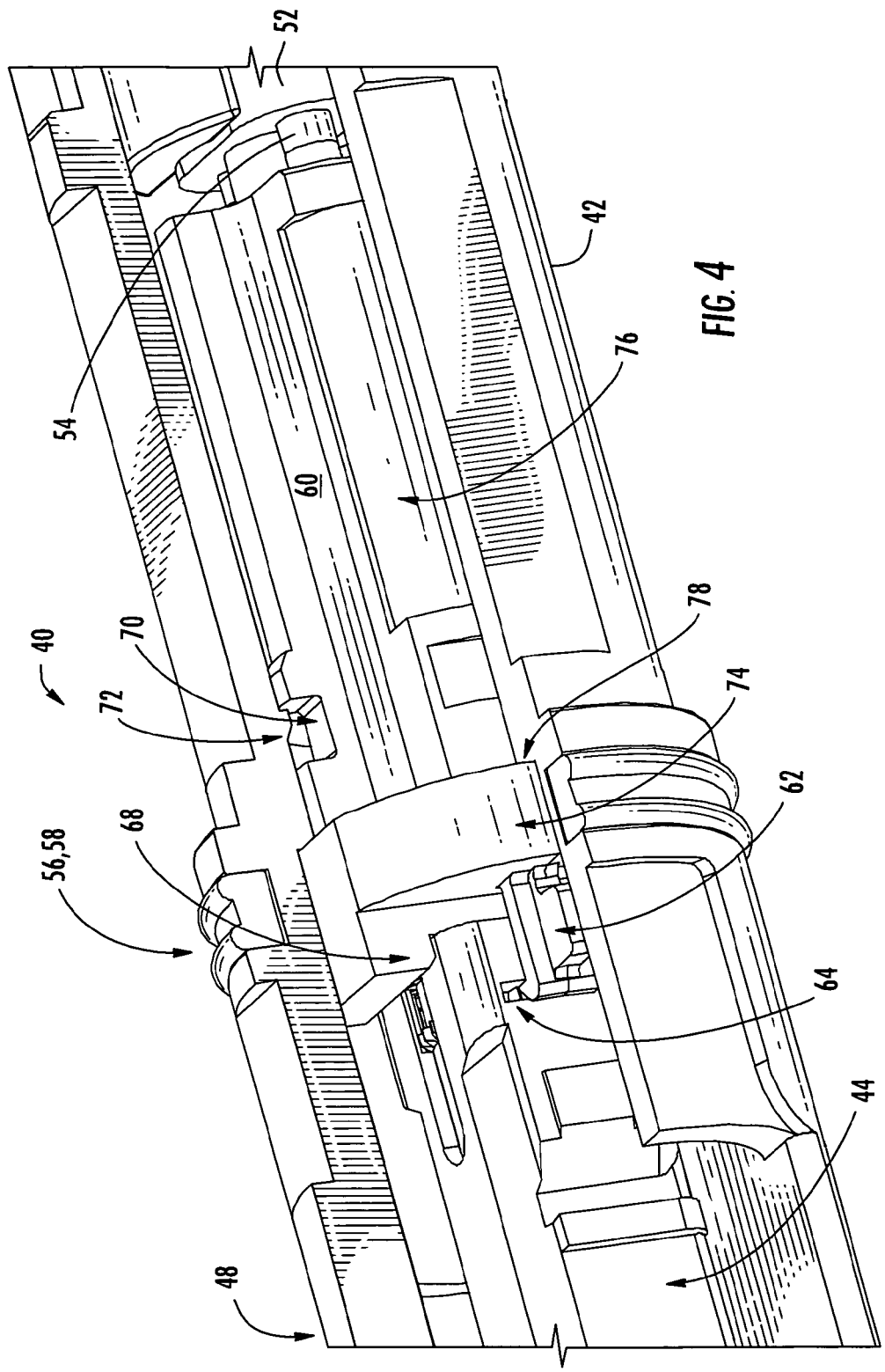
FIG. 4 is another cut-away perspective view of the connector assembly of FIG. 2, highlighting the use of a glue body that is configured to retain both a drop cable having one or more strength members and a connector sub-assembly.
Figure 5:
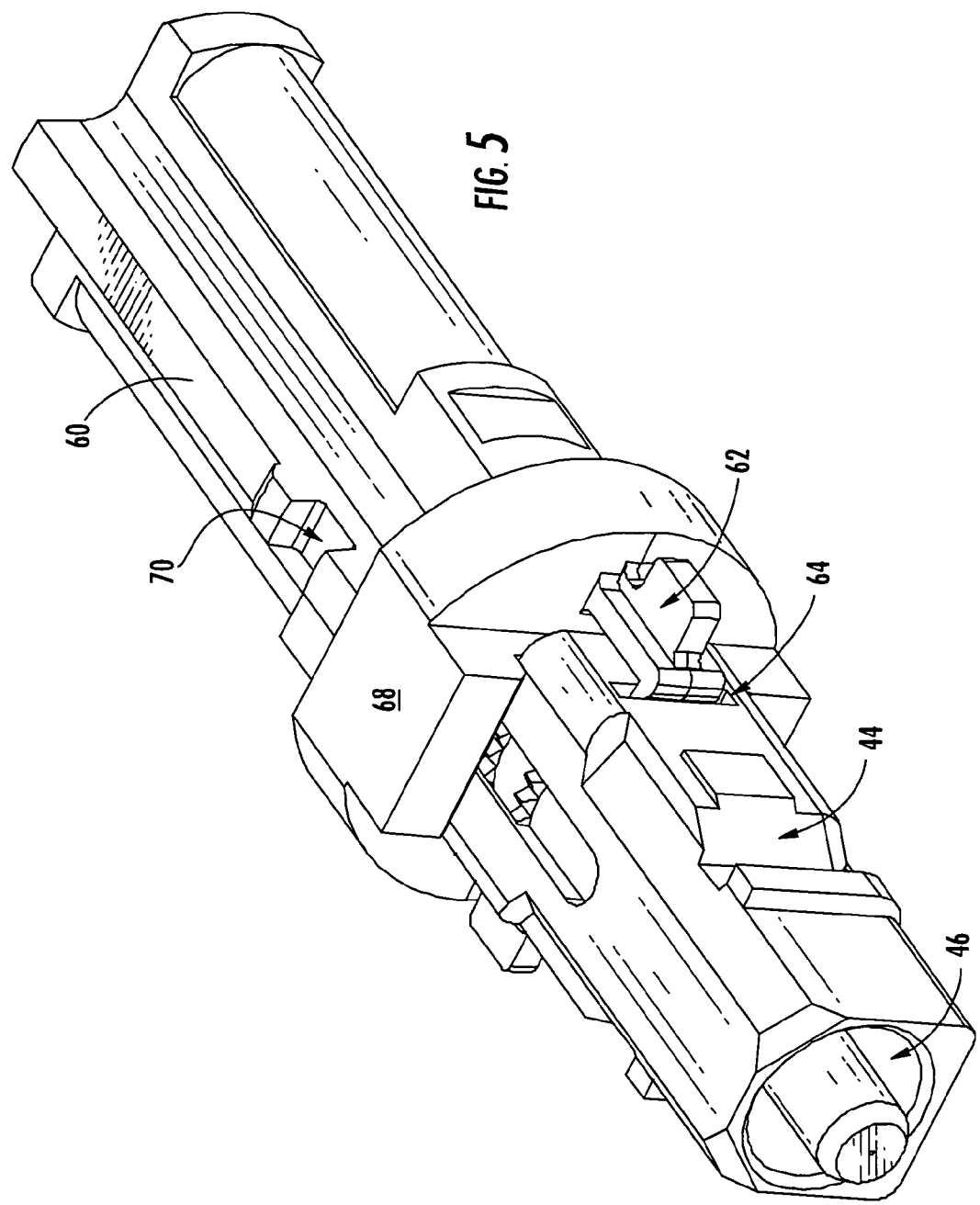
FIG. 5 is an isolated perspective view of the assembled glue body and connector sub-assembly of FIGS. 3 and 4.

Referring to FIGS. 4 and 5, the glue body 60 engages the plug housing 42 (FIG. 4) by means of one or more recesses 70 manufactured into the exterior surface of the glue body 60 and one or more corresponding protrusions 72 (FIG. 4) manufactured into the interior surface of the plug housing 42. Accordingly, the glue body 60 is "snapped" into place within the interior of the plug housing 42. Again, the materials chosen facilitate this and either or both of the recesses 70 or protrusions 72 can have complimentary angled surfaces. Advantageously, this mechanical retention of the glue body 60 within the interior of the plug housing 42 alleviates the problem of endface position variance due to heat shrink pistoning. Importantly, the exterior surface of the glue body 60 and the interior surface of the plug housing 42 also include corresponding flattened and raised surfaces. Thus, the keyed configurations of the glue body 60 and plug housing 42 of the connector assembly 40 (FIG. 4) require that the connector assembly 40 be assembled in one specific orientation. Again, this addresses the unresolved need for an alternative retention method that does not allow multiple ways (i.e., two 180-degree opposing ways) to assemble the connector components, thereby eliminating the requirement for fixturing and verification by an operator in order to make sure that the connector sub-assembly 44 is oriented properly. The geometries involved rely on material flexibility and utilize minor localized interferences between the semi-rigid bodies involved to determine molding tolerances, while maintaining mechanical integrity.

Figure 6:
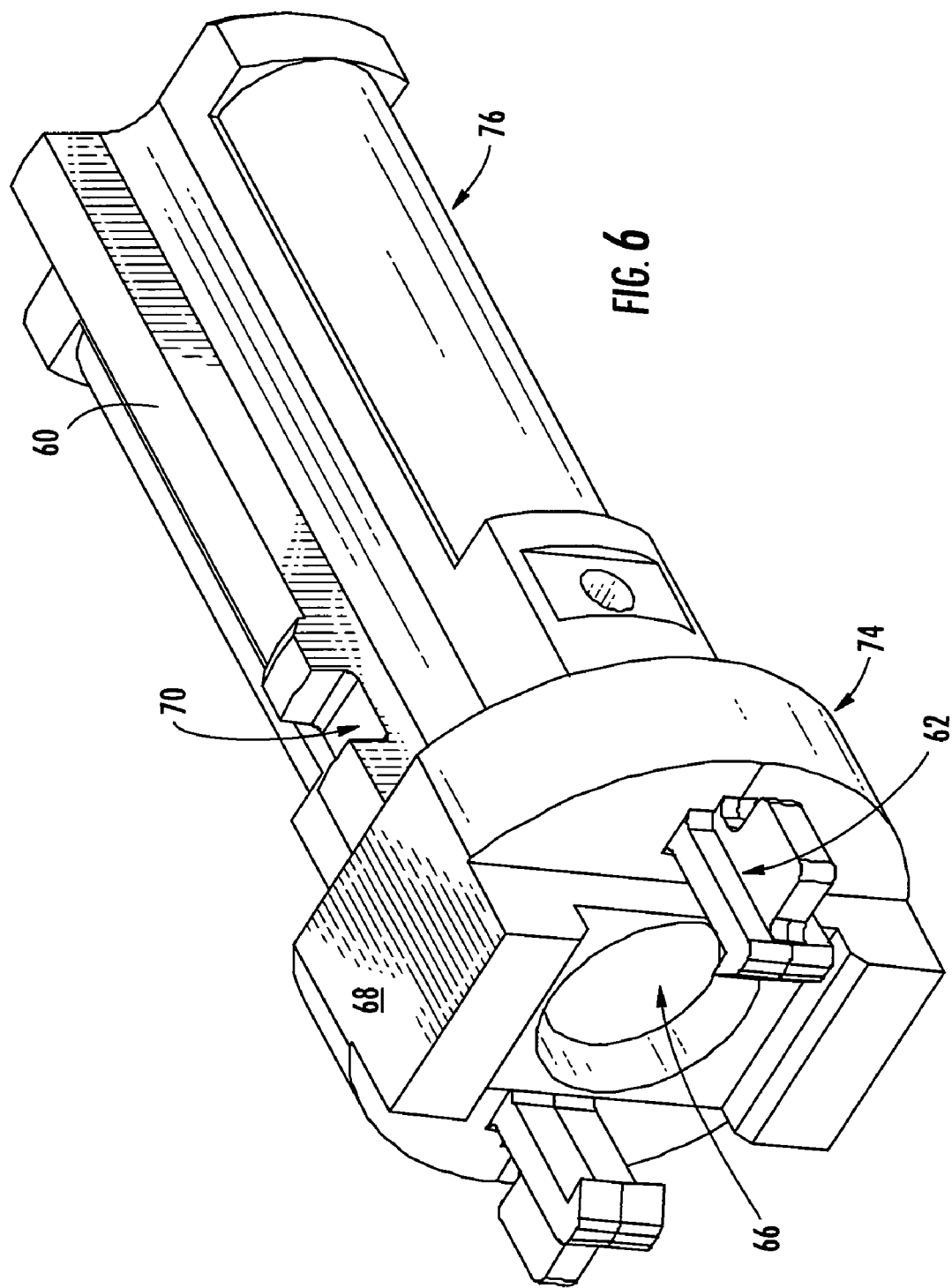
FIG. 6 is an isolated perspective view of the glue body of FIGS. 3-5.

Referring to FIG. 6, the glue body 60 includes a relatively larger diameter portion 74 and a relatively smaller diameter portion 76, the larger diameter portion 74 located proximal to the end of the glue body 60 having the snap hooks 62 and the smaller diameter portion 76 located distal to the end of the glue body 60 having the snap hooks 62. When the glue body 60 is inserted into the plug housing 42, this larger diameter portion 74 acts as a natural stop as it contacts a shelf 78 manufactured into the interior surface of the plug housing 42 (see FIG. 4). As described above, the shaft 25 (FIG. 1) of the connector sub-assembly 44 (FIGS. 2-5) is preferably disposed and held within the bore 66 manufactured into the end of the glue body 60 having the snap hooks 62. This end also includes the pair of alignment blocks 68 that are designed to ensure the proper positioning of the connector sub-assembly 44 on the face of the glue body 60 in conjunction with the snap hooks 62.

In an alternative embodiment, the shaft 25 of the connector sub-assembly 44 is disposed and held between the two halves 14a,14b (FIG. 1) of the former crimp body 14 (FIG. 1), which is now eliminated. These are, in turn, disposed within the bore 66 manufactured into the end of the glue body 60 having the snap hooks 62. As above, this keeps the connector sub-assembly 44 centered with respect to the glue body 60 and the plug housing 42. In another alternative embodiment, the two halves 14a,14b of the former crimp body 14 are combined into a single crimp retainer (not shown) which is disposed within the bore 66 manufactured into the end of the glue body 60 having the snap hooks 62. Again, this keeps the connector sub-assembly 44 centered with respect to the glue body 60 and the plug housing 42.

Figure 7:
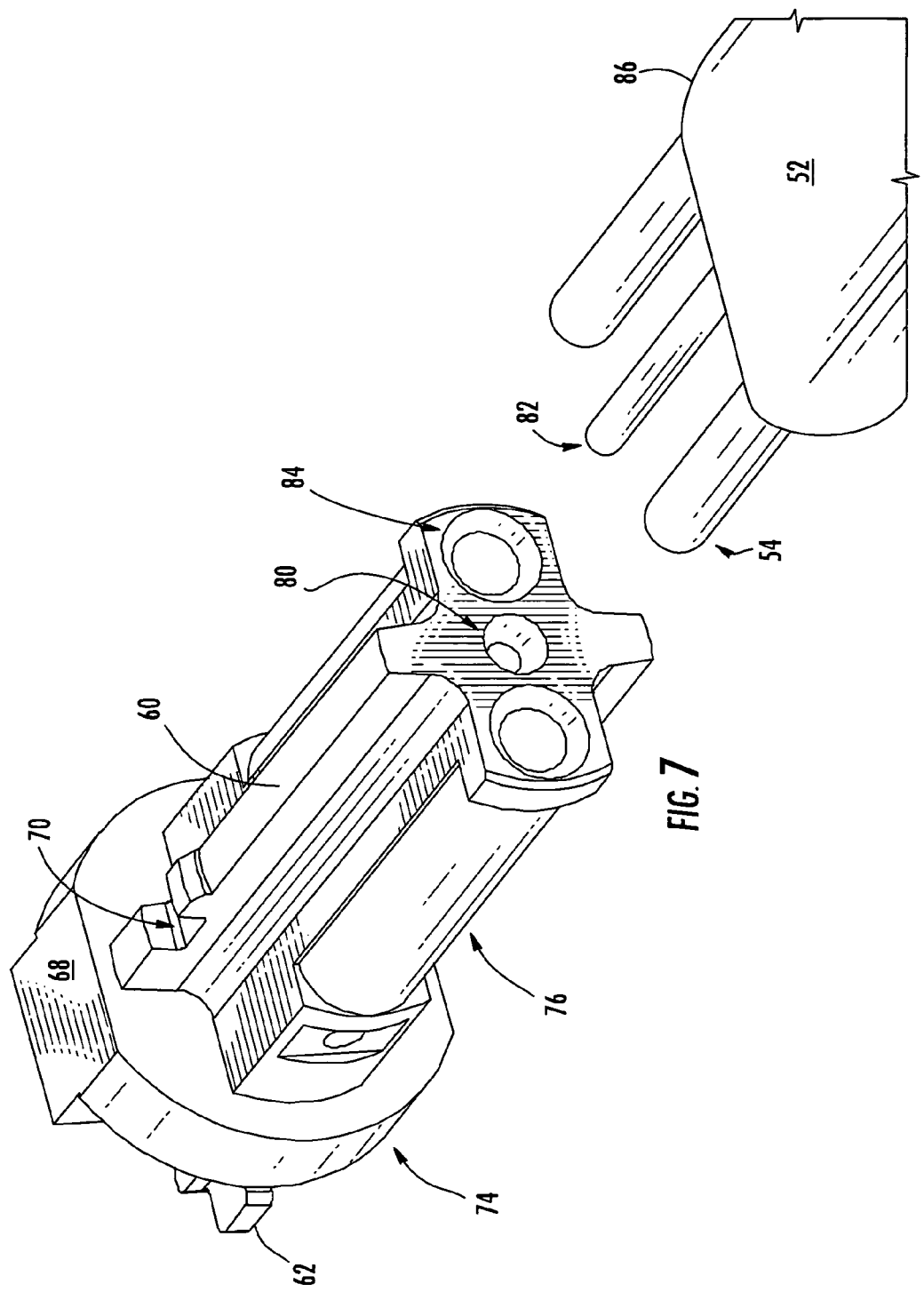
FIG. 7 is another isolated perspective view of the glue body of FIGS. 3-5, highlighting the joining of a substantially flat drop cable incorporating an optical fiber and a pair of GRP strength members with the glue body.

Referring to FIG. 7, the glue body 60 also includes a central channel 80 positioned to receive at least one optical fiber 82 of the drop cable 52 and a pair of edge channels 84 positioned to receive GRP strength members 54 or other strength members of the drop cable 52. The optical fiber 82 (which typically has a diameter of about 250 μm) and the pair of GRP strength members 54 are encased within a drop cable sheath 86, as is well known to those of ordinary skill in the art. Although GRP strength members 54 are illustrated and described herein, the drop cable 52 can include other kinds of strength members as well, or as an alternative. Any such strength members can be accommodated by one or more channels manufactured into the glue body 60. Preferably, the pair of GRP strength members 54 protrude between about 10 mm and about 20 mm (and more preferably, about 17 mm) into the pair of edge channels 84 and the edge channels 84 are filled with an adhesive that serves to bond the drop cable 52 to the glue body 60. The adhesive can be a visible light curable epoxy, or an ultraviolet (UV) light or heat curable glue. All material choices depend upon the pull strength, temperature exposure range, and chemical resistance desired. In the case that a visible light curable epoxy is used, the glue body 60 is preferably substantially transparent such that visible light can reach and cure the epoxy. For example, a natural poly ether imide can be used, also providing a relatively high temperature resistance. This substantially transparent material allows for visual feedback during the adhesive filling and optical fiber routing processes. Advantageously, the pair of edge channels 84 separate the adhesive from the central channel 80 and the optical fiber 82. Because the edge channels 84 are sealed, material is prevented from flowing into the connector assembly 40 (FIGS. 2-4) internals during assembly. The connector assembly 40 of the present invention readily meets about the 100 lbf pull strength requirement desired, due to the use of the glue body 60 and the adhesive. During assembly, preferably, the drop cable 52 is secured to the glue body 60 first, and then the connector sub-assembly 44 (FIGS. 2-5) is attached to the glue body 60.

In an alternative embodiment, the pair of edge channels 84 are configured to accept a pair of wedge-type clamps which are held in place by a pair of uncrimped bands. These wedge-type clamps and uncrimped bands are subsequently fixed onto the GRP strength members 54 by crimping, thereby securing the drop cable 52 to the glue body 60. This represents a non-adhesive solution.

Referring to FIG. 8, the end cap 50 described above includes an insertion end 88 that is configured to be inserted snugly into the "back" end of the plug housing 42 (FIGS. 2 and 3). The end cap 50 also includes a tapering end 90 that is manufactured with a slot opening 92 that is configured to receive the substantially flat drop cable 52 (FIG. 7), which passes through the end cap 50 and into the plug housing 42.

As described above, the retention body 60 of the present invention is coupled to the connector sub-assembly 44 by one or more coupling features, such as the retention snap hooks 62. In conventional connector assemblies, optical fibers and/or strength member movement over time may cause the connector assembly, including the ferrule, to protrude or push forward relative to the connector outer housing or plug shroud, thus resulting in a defective drop cable incapable of proper interconnection. Stops positioned about protrusion 72 may prevent the retention body 60, once snapped into place, from being removed through the front, or connective, end of the plug assembly. Thus, as the fibers or strength members push forward into the retention body 60, the retention body may be stopped from moving internally within the plug housing 42 beyond a predetermined point. By coupling the connector sub-assembly 44 to the retention body 60, the connector sub-assembly is then also prevented from protruding beyond a predetermined point, providing a drop cable capable of proper interconnection over time. In one embodiment, the plug housing 42, retention body 60 and their contact points are capable of withstanding forces up to about 50 lbs.

Although the present invention has been illustrated and described herein with reference to preferred embodiments and specific examples thereof, it will be readily apparent to those of ordinary skill in the art that other embodiments and examples can perform similar functions and/or achieve like results. For example, the mating of two connector assemblies could be achieved by providing a "female" version of the connector assembly (i.e., an outlet). The mating order would be plug-outlet-plug. All such equivalent embodiments and examples are within the spirit and scope of the present invention and are intended to be covered by the following claims.

What is claimed is:

1. A ruggedized fiber optic connector assembly, comprising:
    a substantially hollow plug housing; and
    a retention body disposed within the substantially hollow plug housing;
    wherein the retention body defines one or more edge channels that are configured to receive one or more strength members of an optical cable having at least one optical fiber;
    wherein the retention body comprises a second portion that is configured to engage and retain a connector subassembly by snap-fitting thereto, the connector subassembly comprising at least one optical ferrule; and
    wherein the at least one optical fiber is at least partially disposed in the at least one optical ferrule.

2. The ruggedized fiber optic connector assembly of claim 1, wherein the retention body defines a central bore that is configured to receive the at least one optical fiber at the first portion and the connector sub-assembly at the second portion.

3. The ruggedized fiber optic connector assembly of claim 2, wherein the central bore is configured to receive a shaft of the connector sub assembly at the second portion.

4. The ruggedized fiber optic connector assembly of claim 3, the retention body further comprising a crimp member disposed within the second portion of the central bore, wherein the crimp member is configured to retain the shaft of the connector subassembly.

5. The ruggedized fiber optic connector assembly of claim 1, wherein the second portion of the retention body comprises a pair of opposed snap hooks that are configured to engage a corresponding pair of opposed recesses of the connector subassembly.

6. The ruggedized fiber optic connector assembly of claim 1, wherein the connector subassembly rotates up to about 5 degrees in either a clockwise or counterclockwise direction with respect to the retention body.

7. The ruggedized fiber optic connector assembly of claim 1, wherein the one or more edge channels of the retention body are at least partially filled with an adhesive that retains the one or more strength members.

8. The ruggedized fiber optic connector assembly of claim 7, wherein the adhesive comprises an adhesive selected from the group consisting of an epoxy, a visible light curable epoxy, an ultraviolet light curable glue, and a heat curable glue.

9. The ruggedized fiber optic connector assembly of claim 1, wherein at least a portion of the retention body is optically transparent for curing an adhesive.

10. The ruggedized fiber optic connector assembly of claim 1, wherein the one or more edge channels of the retention body comprise one or more wedge members disposed therein that retain the one or more strength members.

11. The ruggedized fiber optic connector assembly of claim 1, wherein an interior surface of the substantially hollow plug housing comprises one or more protrusions and an exterior surface of the retention body comprises one or more corresponding recesses, the one or more protrusions and the one or more corresponding recesses securing the retention body within the substantially hollow plug housing in a preferred orientation.

12. The ruggedized fiber optic connector assembly of claim 1, wherein the retention body is a single component.

13. The ruggedized fiber optic connector assembly of claim 1, wherein the substantially hollow plug housing includes a plurality of fingers.

14. The ruggedized fiber optic connector assembly of claim 1, further including an o-ring for attachment to the substantially hollow plug housing.

15. The ruggedized fiber optic connector assembly of claim 1, wherein at least a portion of the retention body is optically transparent for curing an adhesive, and an interior surface of the substantially hollow plug housing comprises one or more protrusions and an exterior surface of the retention body comprises one or more corresponding recesses, the one or more protrusions and the one or more corresponding recesses securing the retention body within the substantially hollow plug housing in a preferred orientation, and wherein the connector subassembly rotates up to about 5 degrees in either a clockwise or counterclockwise direction with respect to the retention body.

* * * * *